UNITED STATES PATENT OFFICE.

LUDWIG HEILBRONNER, OF STUTTGART, GERMANY.

PROCESS FOR MAKING PAPER AND PAPER-LIKE MATERIALS WATERPROOF AND IMPERMEABLE TO AIR, AT THE SAME TIME MAINTAINING THEIR SUPPLENESS, AND ARTICLES MADE FROM SUCH MATERIALS.

1,387,004. Specification of Letters Patent. Patented Aug. 9, 1921.

No Drawing. Application filed May 3, 1920. Serial No. 378,711.

*To all whom it may concern:*

Be it known that I, LUDWIG HEILBRONNER, a resident of Stuttgart, with the post-office address Büchsenstrasse 60, Germany, have invented new and useful Improvements in processes for making paper and paper-like materials waterproof and impermeable to air, at the same time maintaining their suppleness, and articles made from such materials, (for which I have filed applications in Germany, No. H71,537, of January 12, 1917, and useful-model application No. H73,029, of January 12, 1917,) of which the following is a specification.

The present invention relates to a process for making a fabric, such as paper and paperlike materials waterproof and impermeable to air, at the same time maintaining their suppleness.

Without excluding other kinds of paper materials from this purpose, so-called Japan paper has been found to form a particularly suitable raw material for this treatment, owing to its long and supple fibers.

The new process consists in the material, *i. e.* Japan paper being treated with an aqueous, and preferably warm mixture of gelatin and agar-agar; such treatment may consist in either coating the paper with said solution or dipping it into the same. After having been dried the paper thus treated is submitted to an after treatment with a mixture of non-drying oil and fish oil.

The hereinafter described procedure may serve as an example for elucidating the process.

2% of gelatin, 1% of agar-agar, 0.5% of bichromate of potash, 3% of chlorid of calcium or still better glycerin and 3% of carbonate of ammonia are dissolved in 100 ccm. of hot water.

Highly absorbent paper is either coated with this solution or dipped into the same and thereupon dried.

The quantities of the various constituents may be varied according to the absorbing power or the size of the meshes of the respective texture.

When the paper treated as hereinbefore described has dried, it is rubbed with a mixture of non-drying oil and fish oil; also in this instance the quantity of these constituents to be employed depends on the quality of the paper or the like to be treated.

The effect of the several constituents is as follows:

1. Gelatin will increase the toughness and strength of the fiber, will, however, render the material somewhat brittle and hard; with the object of preventing this an addition of 2. Agar-agar is made. This will produce very soft, very slimy emulsions, which have a fine touch. Agar-agar will, however, somewhat reduce the toughness. If it is desirable to obtain a product of a high toughness, and brittleness will not be objectionable pure gelatin may be employed. The admixture of agar-agar starch or both is made the greater, the more importance is laid on obtaining a fine, soft touch of the product.

3. Bichromate of potash will render in known manner gelatin and starch insoluble in water, if allowed to act sufficiently long; this action is accelerated by the coöperation of light.

4. Chlorid of calcium or glycerin are both hygroscopic substances which will prevent the drying-out of the gelatin and the starch emulsion and render the material treated with it very supple. When heated, aqueous glycerin and chlorid of calcium will split off water; therefore articles treated therewith will when exposed to a dry heat become brittle, but they will immediately again absorb moisture when brought into normal air, so that they will again become supple. The material with which the paper is treated can dry fully in an artificially heated space only, as the air will always contain a certain percentage of moisture.

If the papers or texture thus treated are placed for some time into water, the glycerin will be gradually lixiviated, and when the articles are subsequently dried, they will become stiff and no more recover when exposed to the air, as the hygroscopic substance has been thus removed. For preventing this the articles are given a thin coating of a non-drying oil and fish oil. This oil coating will repel water.

Oil and fish oil have the property of gradually penetrating deeper and deeper into the gelatin and of combining closer and closer with the gelatin-agar-agar mixture, so that after several months the thus treated materials will become more and more supple, and even an action of water lasting for several days will no more be able to completely remove the glycerin.

5. Carbonate of ammonia: This has the object of reducing the inflammability; it will be held the more strongly in the articles treated, the longer the coating of oil has acted.

The subsequent treatment with oil and fish oil is only necessary with such articles, which will alternately be exposed to water and then be dried again.

According to the purpose the paper is intended for, it will be advisable to glue several layers of paper on each other, in order to increase its strength.

The papers or the like produced after the hereinbefore described process are excellently suited as substitutes for rubber or leather as diaphragms for gasmeters and automatic tele-gaslighters.

Of course the product obtained after the present invention may also be used for other purposes, for example as a substitute for leather.

I claim—

1. The process of producing supple waterproof material impermeable to air, which comprises treating a fabric with a solution mixture of a gelatin and a starch containing substance, and after drying treating the product with an oil.

2. The process of producing supple waterproof material impermeable to air, which comprises treating a fabric with a solution mixture of gelatin and agar-agar, and after drying treating the product with a non-drying oil and fish oil.

3. The process of producing supple waterproof paper impermeable to air, which comprises treating Japan paper with an aqueous mixture of gelatin, agar-agar and starch, and after drying treating the product with an oil.

4. The process of producing supple waterproof paper impermeable to air, which comprises treating the paper with a solution mixture of gelatin, agar-agar, a substance capable of rendering gelatin insoluble in water, a hygroscopic substance and a fireproofing substance.

5. The process of producing supple waterproof paper, which comprises treating a long fiber paper with a hot aqueous solution containing about 2 parts of gelatin, 1 part of agar-agar, 0.50 part of bi-chromate of potash, 3 parts of a hygroscopic substance and 3 parts of ammonium carbonate.

6. The process of producing supple waterproof paper, which comprises treating a long fiber paper with a hot aqueous solution containing about 2 parts of gelatin, 1 part of agar-agar, 0.50 part of bi-chromate of potash, 3 parts of glycerin and 3 parts of ammonium carbonate.

7. A fabric comprising a base of fibrous material having an impregnation of gelatin rendered insoluble in water, and agar-agar, maintained flexible by a hygroscopic material and oiled.

8. A fabric comprising a base of fibrous material impregnated with gelatin insoluble in water, and agar-agar, maintained flexible by a hygroscopic material, fire-proofed and water-proofed.

In testimony that I claim the foregoing as my invention, I have signed my name, this seventh day of April, 1920.

LUDWIG HEILBRONNER.